Figure 1:
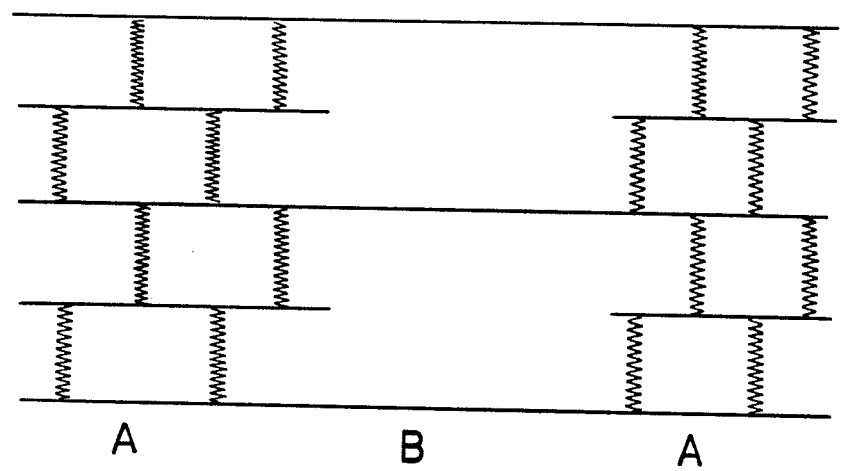

United States Patent [19]

Jedli ski et al.

[11] Patent Number: 4,833,215
[45] Date of Patent: May 23, 1989

[54] SEGMENTED POLYMERS AND A METHOD OF PRODUCING THEM

[76] Inventors: Zbigniew Jedli ski, Gliwice, ul. 16, Karolinki; Antoni Kotas, Zabrze, ul. 13/6, leczka, both of Poland

[21] Appl. No.: 844,714

[22] Filed: Mar. 27, 1986

[30] Foreign Application Priority Data

Dec. 31, 1985 [PL] Poland ................................. 257230

[51] Int. Cl.$^4$ ........................ C08F 20/00; C08L 67/06
[52] U.S. Cl. .................................... 525/437; 525/423; 525/441; 525/444; 525/447; 525/480; 525/491; 525/509; 525/515; 525/519; 525/523; 525/533
[58] Field of Search .............. 525/523, 533, 941, 480, 525/447, 441, 437, 444, 509, 515, 519, 423; 528/110, 113

[56] References Cited

U.S. PATENT DOCUMENTS

| | | | |
|---|---|---|---|
| 3,576,781 | 4/1971 | Hicks | 528/107 X |
| 4,176,221 | 11/1979 | Shimp | 528/103 |
| 4,319,003 | 3/1982 | Gardlund | 525/148 |
| 4,414,367 | 11/1983 | Gardner | 525/531 |
| 4,438,240 | 3/1984 | Tanaka | 525/420 |

FOREIGN PATENT DOCUMENTS 422258A 12/1984 U.S.S.R. .

Primary Examiner—Theodore E. Pertilla
Attorney, Agent, or Firm—Ladas & Parry

[57] ABSTRACT

A new segmented polymer comprising alternately cross-linked multiblocks of duroplast type and linear multiblocks of thermoplast type and a method of producing these new segmented polymers. The polymers have the structure of a multiblock A-B copolymer, where A denotes a spatially cross-linked oligomeric block and B denotes an oligomeric block of thermoplast type. The method according to the invention consists in that a linear reactive trifunctional A oligomer having two reactive terminal groups and at least one reactive internal group is polyreacted with a reactive bifunctional B oligomer having two reactive terminal groups. The linear multiblock A-B prepolymer, having in A blocks at least one unutilized reactive group, is subject to cross-linking. The A oligomer is selected from the group of non-saturated oligoesters, oligoepoxides, phenol-formaldehyde resins and reactive amino resins. The B oligomer is selected from the group of saturated oligoesters, oligoethers, oligoacetals, oligoamides, oligoethers with appropriate reactive groups, as well as higher diamines, dialcohols, aliphatic diacids and oligosilanediols, whose reactive functional groups are capable of polycondensation with terminal functional groups of the trifunctional oligomer.

15 Claims, 1 Drawing Sheet

SEGMENTED POLYMERS AND A METHOD OF PRODUCING THEM

The subject of the invention are new segmented polymers and a method of producing new segmented polymers comprising alternately cross-linked multiblocks of duroplast type and linear multiblocks of thermoplast type. They are new segmented polymers whose thermomechanical and physical properties are intermediate between properties of cross-linked polymers of duroplast and elastomer type, and they may be applicable in various fields of technology as constructional materials.

A known method of modification of polymers is co-polymerization of two or three monomers, and especially multiblock copolymers of -X-Y-type are of particular significance, wherein X and Y are single linear molecules or in some cases few of them are partially cross-linked ones, yielding in the latter case a product having the nature of elastothermoplast as, for example, copolymers of butadiene with styrene, polyurethanes and others /U.S. Pat. Nos. 4,319,003, 4,438,240, 4,414,367 and U.S.S.R. Pat. No. 422258/. Up to the present there is no information on copolymers in which totally cross-linked blocks forming three-dimensional space networks would be connected by linear blocks.

New segmented polymers according to the invention are characterized by that they have the structure of a multiblock A-B copolymer, where A denotes a spatially cross-linked oligomeric block whose chemical constitution is typical of epoxy resin, phenol-formaldehyde resin, amino resin, or other duroplasts, whereas B denotes an oligomeric block of thermoplast type having the constitution of linear aligoester, oligoether, oligoacetal, oligoamide, oligothioether, oligosilanediol or a short hydrocarbon chain.

The method according to the invention consists in that a linear reactive trifunctional A oligomer having two reactive terminal groups and at least one reactive internal group is polyreacted with a reactive bifunctional B oligomer having two reactive terminal groups, and a linear multiblock A-B prepolymer thus obtained, having in A blocks at least one unutilized reactive group, is subject to cross-linking.

The mentioned multiblock A-B prepolymer with alternate linear A blocks and B blocks shows a high degree of ordered state and usually shows a tendency towards forming liquid-crystalline phase and microphase separation.

As a reactive trifunctional A oligomer having two reactive terminal groups and at least one reactive internal group usually oligomers selected from the group including non-saturated oligoesters, oligoepoxides, phenol-formaldehyde resins and reactive amino resins are applied.

As a reactive linear bifunctional B oligomer having two reactive terminal groups an oligomer is applied from the group comprising saturated oligoesters, oligoethers, oligoacetals, oligoamides, oligoethers with appropriate reactive groups, as well as higher diamines, dialcohols, aliphatic diacids and oligosilanediols, whose reactive functional groups are capable of polycondensation with terminal functional groups of the trifunctional oligomer.

A linear multiblock A-B prepolymer having in A blocks at least one unutilized reactive group is then subject to cross-linking proceeding in the course of processing by known processing methods such as casting, press moulding, extrusion moulding, laminating, possibly in the presence of an addition of a catalyst or a reactive C monomer.

Depending on the chemical constitution of the multiblock A-B prepolymer and the type of its functional groups, as reactive C monomers one may apply non-saturated compounds such as, for example, styrene and methacrylate or dicarboxylic acids, dialcohols, diamines, acid anhydrides.

In the latter case a terpolymer is obtained, the composition of which is entered into, apart from linear B blocks, by cross-linked A-C blocks.

As catalysts, depending on the chemical constitution of the A-B prepolymer and the type of its functional groups, one may apply the known acid or basic catalysts, unstable peroxides and others.

The course of synthesis of two polymers according to the invention is presented below in a schematic way:

1° Stage I, this is polymerization of A and B oligomers, yielding a functional prepolymer with functional Z groups.

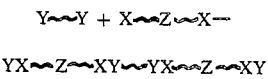

where: YX and XY are groups connecting different blocks obtained in the result of the reaction of functional X and Y groups of A and B oligomers, as, for example, hydroxyl-, carboxyl-, amino-, epoxide groups, etc.

2° Stage II, this is a process of cross-linking in the result of the reaction of Z groups, yielding a segmented copolymer with cross-linked A blocks and linear B blocks.

By the method according to the invention it is possible to carry into effect the synthesis of multiblock A-B copolymers with alternate cross-linked blocks and linear blocks. This is a new class of copolymers having thermomechanical and physical properties intermediate between corresponding properties of spatially cross-linked polymers of the A type /thermo- or chemosetting duroplasts/ and properties of thermoplastic polymers of the B-type structure.

Figure 2:
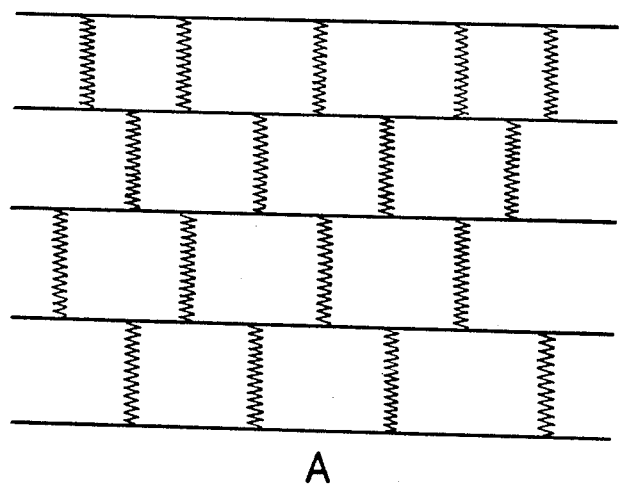

The structure of new block copolymers obtained by the method according to the invention is shown in FIGS. 1 and 2, in which FIG. 2 presents a schematic structure of a cross-linked polymer of duroplast, and FIG. 1 presents a schematic structure of a block A-B polymer, where A denotes a spatially cross-linked block whose chemical constitution is typical of reactive epoxy resin, phenol-formaldehyde resin, reactive amino resin, or other chemo- or thermosetting duroplasts, whereas B denotes a thermoplastic block being spacers between rigid A blocks having the structure of saturated oligoester, oligoether, oligoacetal, oligoamide, saturated hydrocarbon, and others.

The method according to the invention offers vast possibilities for modification of the polymer material, depending on its appropriation and application provided for.

By regulation of the size of blocks A and B it is possible to form physical and processing properties of new block copolymers which, depending on the composition and size of particular blocks, may be processed by the known methods employed in processing of thermosetting polymers /press moulding, casting, laminating/ or in processing of thermoplastic polymers /extrusion moulding, injection moulding/. Block A-B copolymers obtained by the method according to the invention have considerably better mechanical properties in comparison with conventional polymers of the type of cross-linked resins having the A structure of the structure of linear B thermoplasts. New segmented copolymers combine advantageously the properties of both its components.

A special advantage of polymers obtained by the method according to the invention, as constructional materials used also in the form of composites with carbon-, glass- or aramide fibre, is their good mechanical strength, especially high impact resistance, absorptivity of mechanical energy, vibration resistance. Hence result vast possibilities of their application as constructional materials in building engineering of machines, motorcars, airplanes and other responsible engineering constructions.

The comparison of mechanical properties of cross-linked resin of the segmented A-B constitution, obtained by the method according to the invention, with a conventional cross-linked polymer of duroplast type having the chemical composition characteristic of B block is presented in the table.

TABLE

| Type of polymer* | Properties | | | | | |
|---|---|---|---|---|---|---|
| | Heat distortion temperature acc. to Martens °C. | Impact resistance kJ/m$^2$ | Tensile strength MPa | Relative elongation at break % | Bending strength NPa | Modulus of elasticity MPa |
| Cured conventional resin with cross-linked constitution of B type | 90 | 5 | 40 | 2.0 | 90 | 3500 |
| Segmented resin with linear and cross-linked blocks of A-B type /acc. to the invention/ | 75 | 15 | 68 | 5.2 | 150 | 3300 |

*in the cross-linking process the same cross-linking procedure was applied for all types of resins.

The segmented structure of new polymers according to the invention has also an advantageous effect on their processing properties and the quality of obtained therefrom laminates or materials reinforced with, for example, carbon fibre, glass fibre and others, since there is advantageous cooperation and selective wetting of the fibre, with production of an orientated boundary layer of the micelle type, located on the boundary surface, matrix polymer—fibre. Besides, depending on the type of A and B blocks, copolymers according to the invention may show high thermostability and resistance to atmospheric and chemical corrosion.

The below given examples illustrate the invention, without limiting its scope.

EXAMPLE I

From diglycide ether of A bisphenol and diamine of the general formula R—HN—/CH$_2$/$_n$—NH—R, where n=6, by the known method of a linear prepolymer containing free hydroxyl groups was obtained. Next, it was cross-linked in the known reaction with phthalic anhydride. The reaction was conducted in an alloy having the temperature of 120+130° C. and a segmented A-B copolymer with alternate cross-linked and linear blocks was obtained. Cross-linked blocks have the structure of cross-linked epoxy resin, and connecting segments are elastic hydrocarbon chains of linear aliphatic diamine.

EXAMPLE II

Non-saturated linear oligoester obtained in the known reaction of phthalic anhydride, maleic anhydride and -1,3 propylene glycol, was condensated with an equivalent amount of propylene oligoether of the molecular mass of 450. The reaction temperature was 195+210° C. Heating was stopped when the acid number of the reaction mixture was 27–30 mgKOH/g. The cooled product was dissolved in styrene /60 parts by weight per 40 parts by weight of styrene/, was formed into finished elements with an addition of fillers, with the application of 1% ketonox+0.5% cobalt naphthenate /cobalt content—2%/ as an initiator. In the copolymer thus obtained rigid blocks have the structure of cross-linked polyester resin, and elastic blocks have the structure of oligooxypropylene.

EXAMPLE III

Low-molecular phenol resin of the type of reactive resol, obtained from substituted alkylphenol, and oligoether of the general formula HO/CH$_2$RCHO/$_n$H, where R=CH$_3$ and n=6, obtained by polymerization by the known method, were reacted by heating the reaction mixture gradually up to 120° C. and mixing the contents of the reactor during 3 hours. Next, to the prepolymer thus obtained an excessive amount of low-molecular diglycide ether of A bisphenol was added and was processed by the press moulding method at the temperature of 160+200° C. with an addition of glass mat as a filler. Profiles of cross-linked resin thus obtained had the structure of segmented copolymer containing cross-linked blocks having the structure of phenol-formaldehyde /phenoplast/, connected by linear segments of the oligoether type.

We claim:

1. A method of producing segmented polymers, comprising poly reacting a linear trifunctional A oligomer having two reactive terminal groups and at least one reactive internal group with a reactive bifunctional B oligomer having two reactive terminal groups, and subjecting the linear block A-B prepolymer thus obtained, having in A blocks at least one un-utilized reactive group, to cross-linking, wherein said reactive bifunctional B oligomer comprises an oligomer selected from the group consisting of saturated oligoesters, oligoethers, oligoacetals, oligoamides, oligothioethers with appropriate reactive groups, dialcohols, aliphatic diacids and oligosilanediols.

2. A method according to claim 1, wherein said reactive trifunctional A oligomer comprises an oligomer selected from the group consisting of unsaturated oligoesters, oligoepoxides, phenolformaldehyde resins, reactive amino resins and condensation resins.

3. A method according to claim 1, wherein said block A-B prepolymer is subjected to cross-linking by casting, press moulding, extrusion moulding, injection moulding, laminating and adding a catalyst or a reactive monomer.

4. A method according to claim 3 wherein said catalyst comprises the known acid or basic catalysts and unstable peroxides.

5. A method according to claim 3, wherein said reactive monomer is selected from the group consisting of styrene, methacrylate, decarboxylic acids, dialcohols, diamines and acid anhydrides.

6. Segmented polymers of A-B type comprising two segments, one of the segments, segment A, is a cross-linked network structure and the second one, segment B, presents a short linear oligomeric chain, both segments being linked together by chemical bonds, wherein segment A cross-linked network structure is an oligomeric block of a duroplast selected from at least one of the groups consisting of epoxyresins, phenol formaldehyde resins, amino resins, and unsaturated ester resins; and segment B is a linear oligomeric block selected from at least one of the groups consisting of linear oligoesters, oligoethers, oligoacetals, oligothioethers, oligosilanediol, and a short hydrocarbon chain.

7. The segmented polymers as in claim 6 wherein said segment A comprises an epoxy resin and the segment B comprises oligoether.

8. A method, as in claim 1, wherein said segment A comprises an epoxy resin and said segment B comprises oligoether.

9. A segmented polymer of A-B type comprising two segments, one of the segments, segment A, is a cross-linked network structure and the second one, segment B is a short linear oligomeric chain, both segments being linked together by chemical bonds, the polymer being prepared by polyreacting a linear trifunctional A oligomer having two reactive terminal groups and at least one reactive internal group with a reactive bifunctional B oligomer having two reactive terminal groups, and subjecting the linear block A-B prepolymer thus obtained, having A blocks with at least one un-utilized reactive group, to cross-linking wherein said reactive bifunctional B oligomer comprises an oligomer selected from the group consisting of saturated oligoesters, oligoethers, oligoacetals, oligoamides, oligothioethers with appropriate reactive groups, dialcohols, aliphatic diacids and oligosilanediols.

10. Segmented polymers as in claim 9 wherein the segment A cross-linked network structure is an oligomeric block of a duroplast whose chemical constitution comprises at least one of the group consisting of epoxy resins, phenol-formaldehyde resins, amino resins, and non-saturated ester resins, and segment B is a linear oligomeric block selected from one of the group consisting of linear oligoesters, oligoethers, oligoacetals, oligothioethers, oligosilanodiols and short hydrocarbon chains.

11. The segmented polymers, according to claim 6 wherein said segment B is oligoether.

12. The segment polymers according to claim 6 wherein said cross linked and linear segments are alternating cross linked and linear segments.

13. The method according to claim 1 wherein the polyreaction occurs at a temperature of 120°–130° C.

14. The method according to claim 1 wherein the polyreaction occurs at a temperature of 195°–210° C.

15. The method according to claim 1 wherein the polyreaction occurs at a temperature of 160°–200° C.

* * * * *